US010067258B2

(12) United States Patent
Hill et al.

(10) Patent No.: US 10,067,258 B2
(45) Date of Patent: Sep. 4, 2018

(54) DOWNHOLE MEASUREMENT AND SURVEY TOOLS WITH CONFORMABLE SENSORS (71) Applicant: Halliburton Energy Services, Inc., Houston, TX (US)

(72) Inventors: Jim Taylor Hill, Kingwood, TX (US); Neeraj Sethi, Gurgaon (IN); Burkay Donderici, Houston, TX (US); Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 14/915,868

(22) PCT Filed: Sep. 30, 2014

(86) PCT No.: PCT/US2014/058183
§ 371 (c)(1),
(2) Date: Mar. 1, 2016

(87) PCT Pub. No.: WO2015/050841
PCT Pub. Date: Apr. 9, 2015

(65) Prior Publication Data
US 2016/0202381 A1    Jul. 14, 2016

(30) Foreign Application Priority Data
Oct. 3, 2013   (IN) ............... 2935/DEL/2013

(51) Int. Cl.
G01V 3/18    (2006.01)
E21B 47/00   (2012.01)
(Continued)

(52) U.S. Cl.
CPC ............... *G01V 3/18* (2013.01); *E21B 47/00* (2013.01); *E21B 47/0002* (2013.01); *G01V 3/26* (2013.01); *G01V 3/34* (2013.01)

(58) Field of Classification Search
CPC ... G01V 3/18; G01V 3/26; G01V 3/28; G01V 3/34; G01V 1/40; E21B 47/00; E21B 47/0002; E21B 47/0006
See application file for complete search history.

(56) References Cited

U.S. PATENT DOCUMENTS 4,292,588 A    9/1981  Smith
4,292,589 A    9/1981  Bonner
(Continued)

OTHER PUBLICATIONS

International Preliminary Report on Patentability issued in related Application No. PCT/US2014/058183, dated Apr. 14, 2016 (13 pages).
(Continued)

*Primary Examiner* — Orlando Bousono
(74) *Attorney, Agent, or Firm* — Scott Richardson; Baker Botts L.L.P.

(57) ABSTRACT

According to aspects of the present disclosure an example downhole tool may include a tool body and a first conformable sensor coupled to the tool body. The first conformable sensor may include a flexible material, with a transmitter and receiver coupled to the flexible material. The downhole tool further may include an arm extendable from the tool body and a pad coupled to the arm. The first conformable sensor may be coupled to the pad.

22 Claims, 8 Drawing Sheets (51) Int. Cl.
*G01V 3/34* (2006.01)
*G01V 3/26* (2006.01)

(56) References Cited

U.S. PATENT DOCUMENTS

| | | | | |
|---|---|---|---|---|
| 5,064,006 | A * | 11/1991 | Waters | E21B 7/068 |
| | | | | 175/45 |
| 5,230,387 | A * | 7/1993 | Waters | E21B 7/068 |
| | | | | 175/45 |
| 5,869,767 | A | 2/1999 | Hayward et al. | |
| 6,173,793 | B1 * | 1/2001 | Thompson | E21B 47/01 |
| | | | | 175/24 |
| 2002/0062992 | A1 | 5/2002 | Fredericks et al. | |
| 2002/0167418 | A1 | 11/2002 | Goswami et al. | |
| 2002/0195276 | A1 * | 12/2002 | Dubinsky | E21B 7/04 |
| | | | | 175/24 |
| 2006/0255810 | A1 * | 11/2006 | Yu | E21B 47/024 |
| | | | | 324/338 |
| 2009/0003130 | A1 * | 1/2009 | Barolak | E21B 47/0006 |
| | | | | 367/35 |
| 2009/0085570 | A1 * | 4/2009 | Signorelli | G01V 3/28 |
| | | | | 324/338 |
| 2009/0243618 | A1 * | 10/2009 | Wang | G01V 3/28 |
| | | | | 324/338 |
| 2009/0294174 | A1 * | 12/2009 | Harmer | E21B 47/06 |
| | | | | 175/45 |
| 2010/0259268 | A1 * | 10/2010 | Zhang | G01V 3/28 |
| | | | | 324/339 |
| 2012/0152013 | A1 * | 6/2012 | Wilson | E21B 47/02208 |
| | | | | 73/152.54 |
| 2013/0066559 | A1 * | 3/2013 | Fang | G01V 3/30 |
| | | | | 702/11 |
| 2013/0239673 | A1 * | 9/2013 | Garcia-Osuna | E21B 17/16 |
| | | | | 73/152.46 |
| 2013/0289880 | A1 * | 10/2013 | Gorek | G01V 3/30 |
| | | | | 702/7 |

OTHER PUBLICATIONS

International Search Report and Written Opinion issued in related PCT Application No. PCT/US2014/058183 dated Jan. 8, 2015, 16 pages.

Goldfine, Neil, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

Goldfine, Neil, et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Goldfine, Neil, "MWM-Array Eddy Current Sensors for Detection of Cracks in Regions with Fretting Damage", Materials Evaluation, ASNT, Jul. 2002, vol. 60, No. 7.

* cited by examiner

DOWNHOLE MEASUREMENT AND SURVEY TOOLS WITH CONFORMABLE SENSORS

CROSS REFERENCE TO RELATED APPLICATIONS

The present application is a U.S. National Stage Application of International Application No. PCT/US2014/058183 filed Sep. 30, 2014, and claims priority to Indian provisional number 2935/DEL/2013, filed Oct. 3, 2013, titled "Downhole Measurement And Survey Tools With Conformable Sensors," both of which are incorporated herein by reference in their entirety for all purposes.

BACKGROUND

The present disclosure relates generally to downhole drilling operations and, more particularly, to downhole measurement and survey tools with conformable sensors. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements of downhole elements within the wellbore may be generated, including measurements of a casing within the wellbore. Typically, those measurements are limited with respect to their granularity, and small features within the wellbore may not be identifiable through the measurements. Moreover, the casing can interfere with measurements intended to identify elements outside of the casing.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to downhole measurement and survey tools with conformable sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval, and sampling along sections of the formation. Embodiments may be implemented with tools that, for example, may be conveyed through a flow passage in tubular string or using a wireline, slickline, coiled tubing, downhole robot, or the like.

The terms "couple," "coupled," and "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 11:
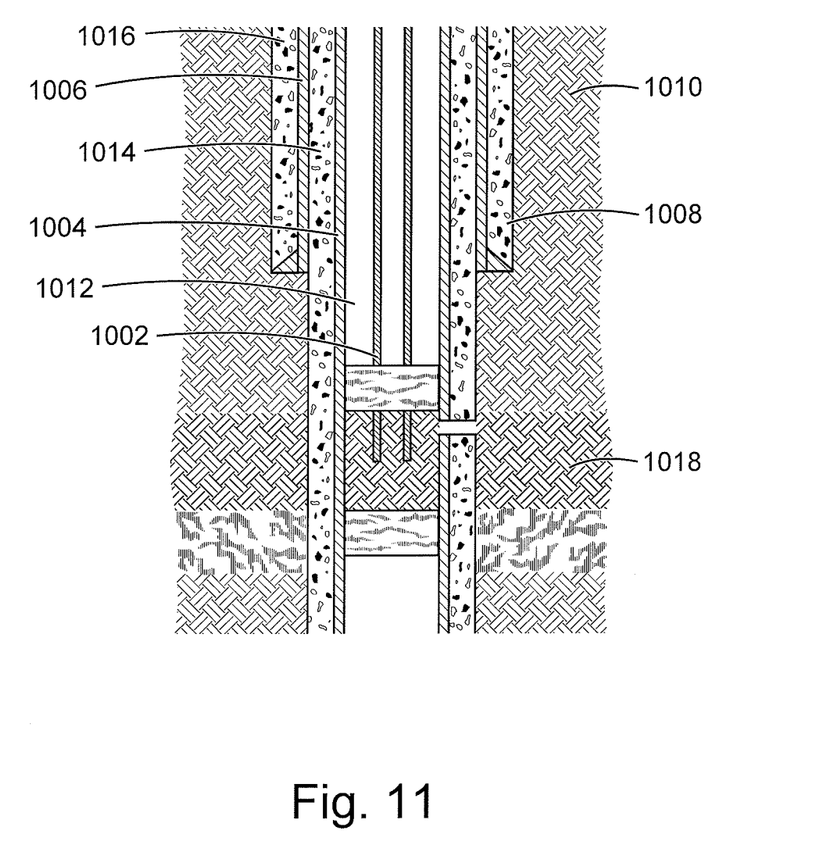
FIG. 11 is a diagram showing an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 11 is a diagram showing an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and/or while it is being drilling, protecting a water table in the formation 1010 from contamination, and/or maintaining pressure within the borehole 1008. Accordingly, damage to the integrity of the casings 1002-1006 may compromise these purposes and/or otherwise interfere with drilling operations and/or production of the well. Common damage to the casings includes crack and corrosion, which can be an indication of a defective cement bond between a casing and the borehole wall. Downhole measurements may be used to survey the casings 102-106 to identify damage.

According to aspects of the present disclosure, a downhole tool with at least one conformable sensor may be placed downhole in either an open hole (non-cased) environment or a cased environment, to measure and survey downhole elements, such as downhole casings, boreholes, and formations. As used herein, conformable sensors may comprise planar sensors that are printed or disposed on a material that can conform to the shape of a surface with which it is in contact, and may produce high-resolution, azimuthally sensitive measurements that can be used to visualize that surface. As will be described below, individual conformable sensors or arrays of conformable sensors may be used in various configurations on a downhole tool to provide high-resolution imaging of measured permeability or conductivity of a downhole element.

Figure 1:
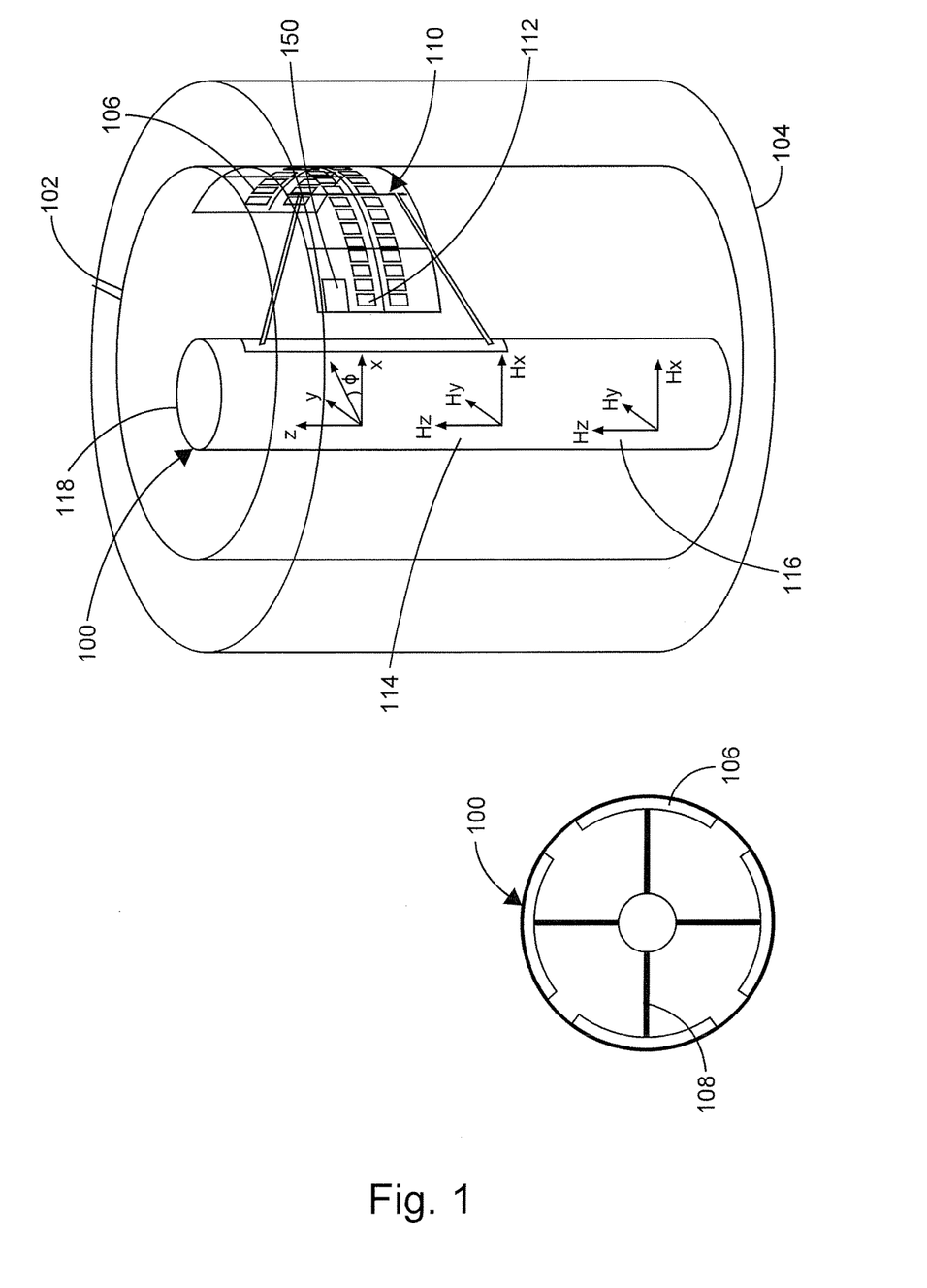
FIG. 1 is a diagram showing an example downhole tool with conformable sensors, according to aspects of the present disclosure.

FIG. 1 is a diagram that shows two views of an example downhole tool 100 with at least one conformable sensor 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. The conformable sensor 112 may include a primary winding having extended portions for creating an electromagnetic (EM) field in a target, in this case the pipe 102, and secondary windings within the primary winding for measuring the current response of the target to the generated EM field. The measured current response may be processed to identify physical parameters of the target, as will be described below. The resolution of the measurements taken by the conformable sensor 112 may increase as the "stand-off" distance between the sensor 112 and the target decreases.

In the embodiment shown, the conformable sensor 112 is one of an array of conformable sensors 110 coupled to a pad 106 that is coupled to and extendable from the tool body 118 through spring mechanisms or motorized arms 108 to contact the pipe 102. Other locations and arrangements for the conformable sensor 112 are possible and will be described below. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102, decreasing the stand off distance between the sensor 112 and pipe 102 and which may increase the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and/or other stations cover other sets, providing full coverage.

As stated above, the conformable sensor 112 may include at least one portion that functions as a transmitter to generate electromagnetic (EM) fields in a target, such as the pipe 102, and at least one portion that functions as a receiver that receives and/or measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids, or rotating and/or moving magnets. In certain embodiments, EM fields may be generated and the corresponding current responses measured with any combination of the transmitter 114, the receiver 112, and the transmitters and receivers within the conformable sensor 112. Notably, when the transmitter is farther away from the receiver, the depth of investigation may increase but the measurement resolution may decrease.

In use, the downhole tool 100 may generate high-resolution measurements of the pipe 102 or other target by placing the pad 106 in contact with the pipe 102 and transmitting a time-varying EM signal from a transmitter of the conformable sensor 112. The signal may generate eddy currents in the pipe 102. The eddy currents may generate secondary currents that contain information about the pipe 102, and the secondary currents may be measured at some or all of the receivers of the conformable sensor 112. Conversely, the downhole tool 100 may generate low-resolution measurements of the pipe 104 by transmitting a time-varying electromagnetic signal from transmitter 114 and measuring the current response of the pipe 104 at one or more receivers of the conformable sensor 112.

Figure 2:
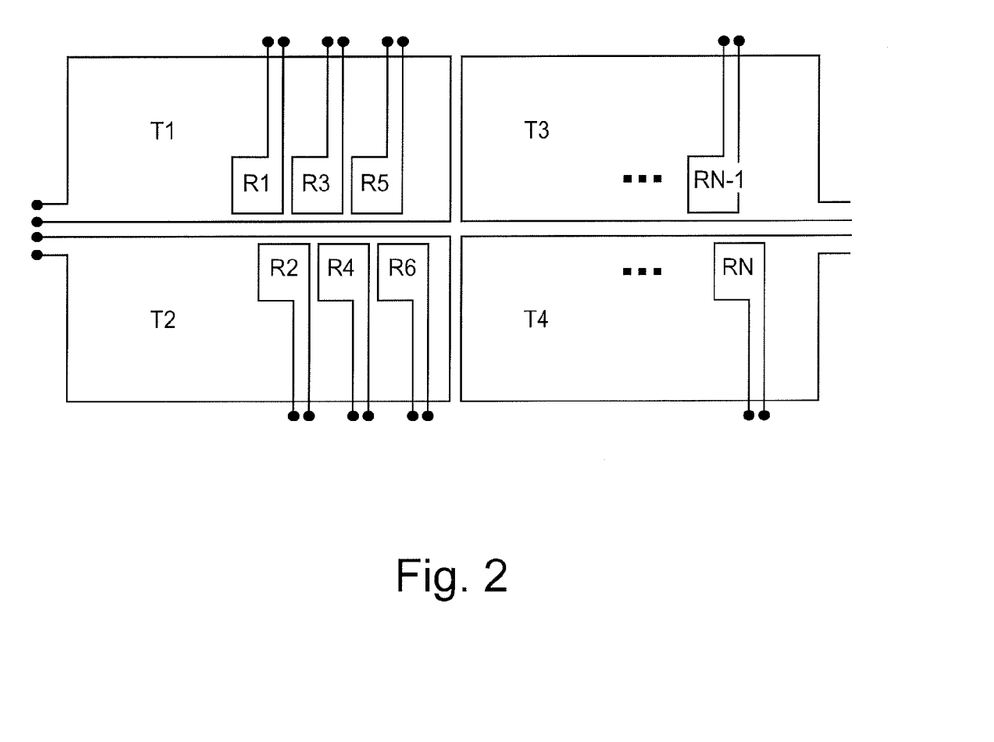
FIG. 2 is a diagram showing example antenna windings for a conformable sensor, according to aspects of the present disclosure.

FIG. 2 is a diagram of example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1-T4 and staggered receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. Although one example of antenna windings for a conformable sensor is shown in FIG. 2, other configurations are possible. For example, the size and relative positions of the transmitters T1-T4 and receivers R1-RN may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN. The number and size of the receiver pairs may determine the granularity and resolution of the measurements.

Figure 3:
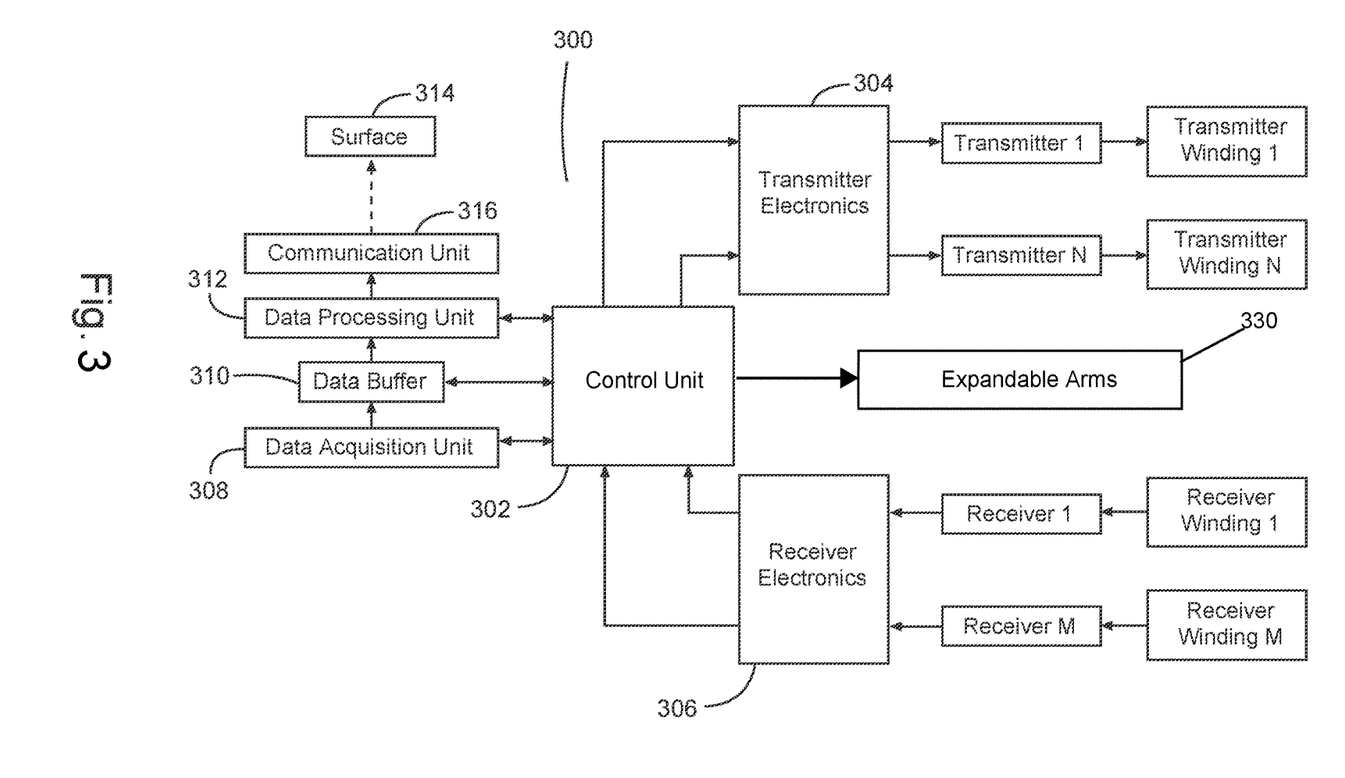
FIG. 3 is a diagram showing an example control system for a downhole tool with conformable sensor array, according to aspects of the present disclosure.

In certain embodiments, the conformable sensors and downhole tool may be controlled through a control system associated with the downhole tool. FIG. 3 is a diagram of an example control system 300 for a downhole tool with conformable sensors, according to aspects of the present disclosure. The system 300 comprises a control unit 302 that may function as the primary controller for the tool and may be communicably coupled to transmitters 1-N through transmitter electronics 304, to receivers 1-M through receiver electronics 306, and to mechanical, electrical or hydraulic elements 330 coupled to and configured to extend pads to which the transmitters 1-N and receivers 1-M coupled. Other mechanical, electrical, or hydraulic element of the tool may also be coupled to the control unit 302. At least one of the transmitters 1-N and receivers 1-M may comprise elements of a conformable sensor or an array of conformable sensors. The transmitter electronics 304 and receiver electronics 306 may comprise circuit boards to which some or all of the transmitters 1-N and receivers 1-M are coupled.

The control unit 302 may trigger the transmitter electronics 304 to generate a time-varying EM signal through one or more of the transmitters 1-N. The time-varying signal may be a sinusoidal signal, its phase and amplitude set at a desired value. As is described above, the EM signals generated through the transmitters 1-N may be coupled to and generate eddy currents in the pipe or borehole that are in immediate contact with the conformable sensors, and the eddy currents may generate secondary currents that contain information about the pipe or borehole, including features of the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 302 may receive the measurements from the receivers 1-N through the receiver electronics 306 and may transmit the measurements to the data acquisition unit 308. For a specific transmitter excitation, measurements from multiple receivers can be generated and received at the same time. Similarly, multiple transmitters 1-N can be excited at the same time and they can be time, frequency, or jointly multiplexed for latter demultiplexing operation at the receivers. Upon reception at the data acquisition unit 308, the measurements may be digitized, stored in a data buffer 310, preprocessed at data processing unit 312, and sent to the surface 314 through a communication unit 316, which may comprise a downhole telemetry system.

In certain embodiments, the control unit 302 may further select the combinations of the transmitters and receivers to use to make measurements. The control unit 302 may comprise a set of instructions and may generate control signals to the transmitter and receiver electronics based, at least in part, on the instructions. For example, the control unit 302 may issue control signals to the transmitter and receivers to take different types of measurements within certain time periods. Example types of measurements include measurements with low-depth of investigations, medium depth of investigation, and high depth of investigation.

According to aspects of the present disclosure, the measurements from the multi-layer conformable sensors of the downhole tool may be aggregated and processed to produce a visualization of the downhole elements surveyed or measured by the downhole tool. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm. The inversion algorithm may be specific to the environment in which the downhole tool is used (cased or open hole) and may be designed to calculate downhole parameters unique to the environment.

Figure 4:
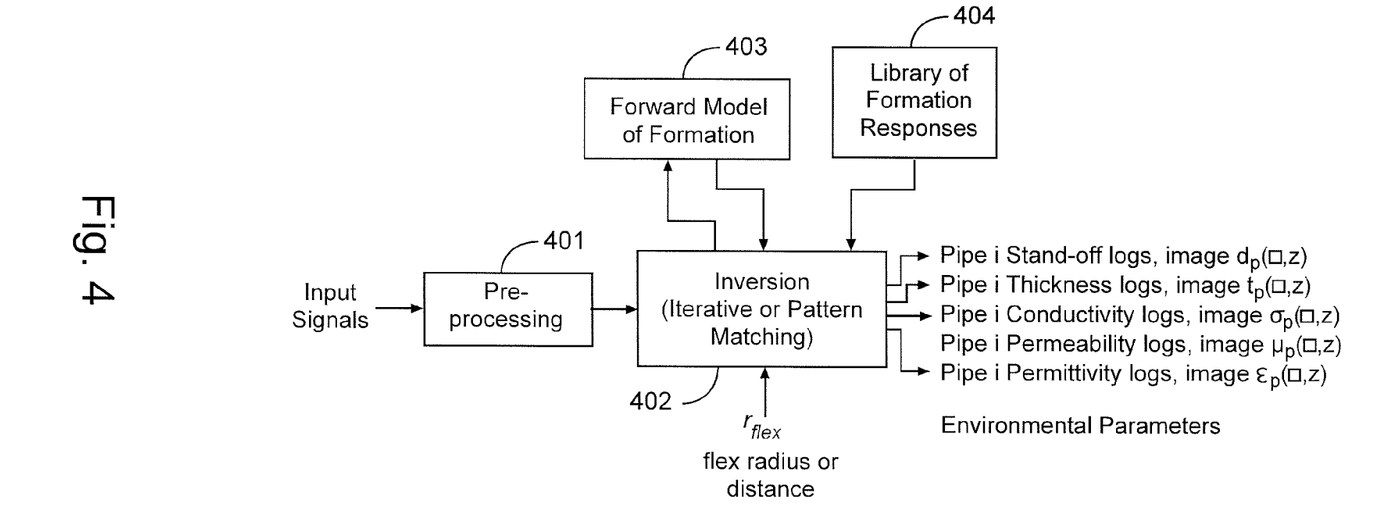
FIG. 4 is a block diagram showing an example inversion algorithm for logging applications using conformable sensors, according to aspects of the present disclosure.

FIG. 4 is a block diagram showing an example inversion algorithm for a pipe logging application, according to aspects of the present disclosure. Input signals may comprise measurements from the receivers of the downhole tool, including the receivers of the conformable sensors. The inversion algorithm may comprise a pre-processing block 401, which may receive the input signals. The pre-processing block 401 may process the input signals to compensate for downhole conditions or to convert the input signals to a form usable within the inversion block 402. For example, the pre-processing block 401 may process the measurements to calibrate for temperature effects, convert between frequency to time domain, convert between complex-value to phase and amplitudes, and/or to remove noise by filtering in azimuth or depth.

The inversion algorithm further may comprise the inversion block 402, which may receive and process the signals from the pre-processing block 401 to calculate parameters of the casings. In certain embodiments, the inversion block 402 may receive a model 403 of the casing or pipe in which the downhole tool was disposed. The inversion block 402 may implement a cost function to calculate parameters of the casing or casings that produce the minimum mismatch between the model 403 and the input signals. The cost function may be defined, for example, by utilizing least squares minimization through $L_2$ norm. The inversion block 402 may output data on one or more parameters of the casings.

In certain embodiments, a library 404 of casing responses from other casings and conformable sensors can be used instead of or in addition to the model 403. For example, the library 404 may be used if the parameter dimensions of the casing responses are low in number and also small in range, so that an accurate library can be calculated. If library 404 is used, a multi-dimensional interpolation can be used to obtain the parameters of the casing closest to the measurements.

The inversion block 402 may generate output including one or more parameters of the casings measured by the downhole tool that may be used to visualize the casing. Example parameters include the stand-off distance between the conformable sensors and the casing, as well as the thickness, conductivity, permeability, and permittivity of the casing.

The inversion block 402 may generate similar parameters for a borehole and formation. Because of the resolution offered by the conformable sensors, very small features (on the order of 0.1 inches) can be imaged on the casing in direct contact with the conformable sensor. In a multi-casing environment, the image for each additional casing is of decreasing resolution due to the increasing stand-off of the casings to the transmitters and receivers of the conformable sensors. A similar inversion algorithm may be used to visualize aspects of the borehole in an open hole environment.

Figure 5A:
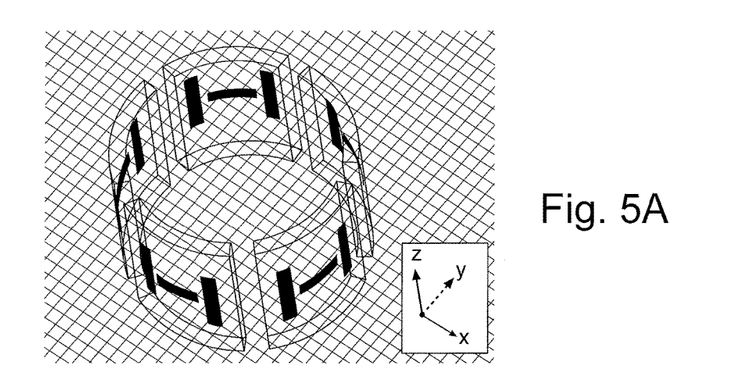
FIGS. 5A-5C are diagrams showing alternative orientations of conformable sensors on extendable pads, according to aspects of the present disclosure.
Figure 5B:
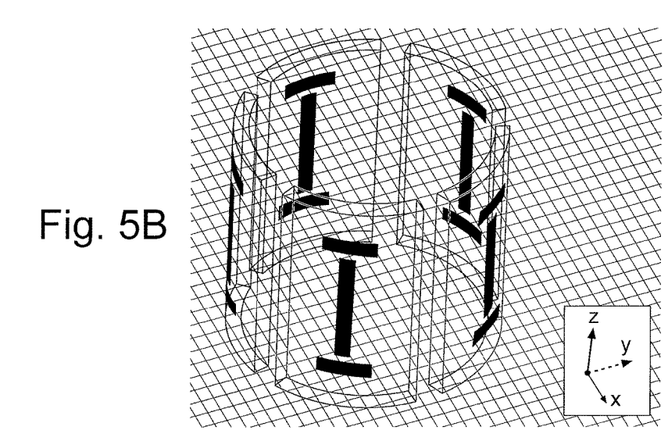
Figure 5C:
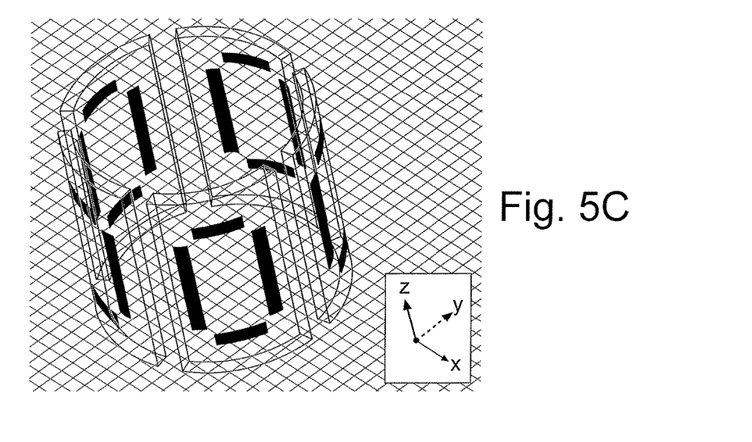

As described above, the conformable sensors may be coupled to the tool body of a downhole tool in numerous configurations. FIGS. 5A-5C are diagrams showing alternative orientations of conformable sensors 500 on extendable pads 502, which may be used in place of or in addition to the conformable sensor array described with respect to FIG. 1. The pads 502 may comprise pads that are evenly spaced around the diameter of a downhole tool and extendable to contact a downhole element, such as a casing or borehole, to take measurements in different azimuthal orientations. As can be seen, the conformable sensors 500 may be placed in both longitudinal and horizontal directions, using different numbers of conformable sensors and relative positions on the pads. Having both longitudinally and horizontally oriented conformable sensors 500 may improve both the vertical and horizontal resolution of the tool. The conformable sensors 500 may have different physical dimensions, such as height, length, etc. and may have different numbers and orientations of transmitters and receivers. Additionally, the orientation of the conformable sensors 500 on each of the pads may differ. Accordingly, the resolution and depth of investigation of the resulting measurements may depend, in part, on the configurations of the individual conformable sensors as well as the configurations of all of the conformable sensors with respect to the pads 502 and the downhole tool.

Figures 6, 7:
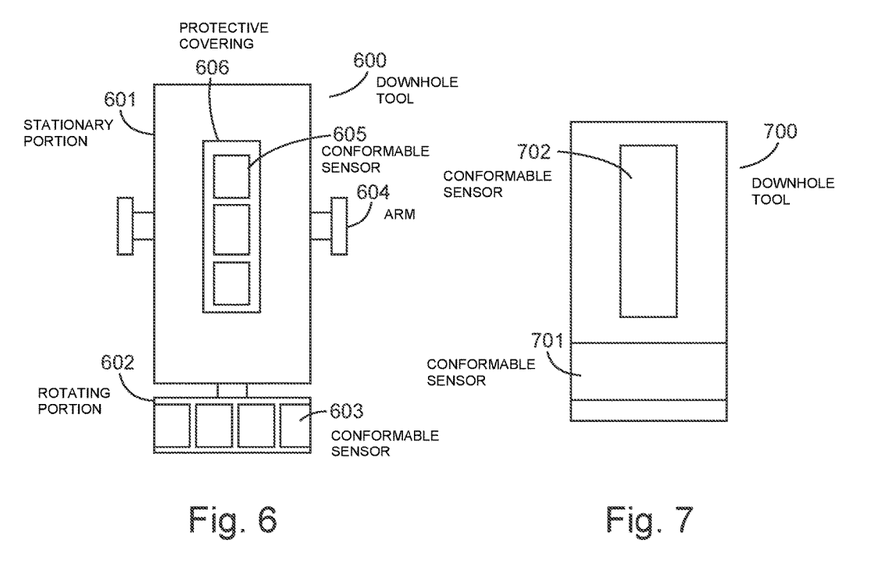
FIG. 6 is a diagram showing an example downhole tool with conformable sensors, according to aspects of the present disclosure.
FIG. 7 is a diagram showing an example downhole tool with conformable sensors, according to aspects of the present disclosure.

FIG. 6 is a diagram showing another example downhole tool 600 with conformable sensors, according to aspects of the present disclosure. The downhole tool 600 may comprise a wireline survey tool that is physically and communicably coupled to the surface through a wireline or slickline and that is lowered into an open borehole or a cased well, depending on the application. In the embodiment shown, the downhole tool 600 comprises a tool body with a stationary portion 601 and a rotating portion 602. The rotating portion 602 may be controlled by an electric motor and control unit within the stationary portion 601. An array of conformable sensors 603 may be wrapped around the circumference of the rotating portion 602. The array 603 may make azimuthal measurements in the medium surrounding the tool. The number of conformable sensors 603 on the rotating portion 602 is variable, depending on the application. For example, in certain embodiments, a single conformable sensor may be placed on the rotating portion 602, or conformable sensors may be set at intervals around the rotating portion 602. Additionally, a single conformable sensor may be wrapped around the entire rotating portion 602.

The downhole tool 600 may also comprise one or more conformable sensors arranged axially on the downhole tool 600 to increase the axial resolution of the resulting measurements. In the embodiment shown, an axial or vertical array of conformable sensors 605 is positioned on the stationary portion 601. Additional axial arrays may be positioned at intervals around the stationary portion 601. In certain embodiments, the downhole tool 600 may include centralizers, such as arms 604, that are extendable to provide a known stand-off distance between the array 603 and the target. In certain embodiments, one or more conformable sensors may be extendable from the tool to contact a downhole element.

In certain embodiments, an optional protective covering 606 may be included on downhole tool 600. The protective covering 606 is shown overlaying the axial array 605. The protective covering 606 may be located directly over any one of the conformable sensors, or may be fashioned as a sleeve that protects some of all of the conformable sensors. The covering 606 may be made out of Teflon, for example, and the conformable sensors 605 may measure erosion within the covering 606 to determine when the covering 606 needs to be replaced. A similar covering may be used to cover the radial array of conformable sensors 603 on the rotating portion 602.

FIG. 7 is a diagram of another example downhole tool 700 which can be used in either a non-rotating or fully-rotating application, in a wireline tool or in a LWD/MWD system. The downhole tool 700 comprises a single conformable sensor 701 that is wrapped around the tool 700. Likewise, a single conformable sensor 702 is arranged axially on the tool 700, to provide axial resolution. Although not shown, a protective covering may be used on downhole tool 700 to prevent damage to the sensors 701 and 702. In certain embodiments, arrays of conformable sensors may also be used on tool 700 in place of the single conformable sensors.

Figure 8:
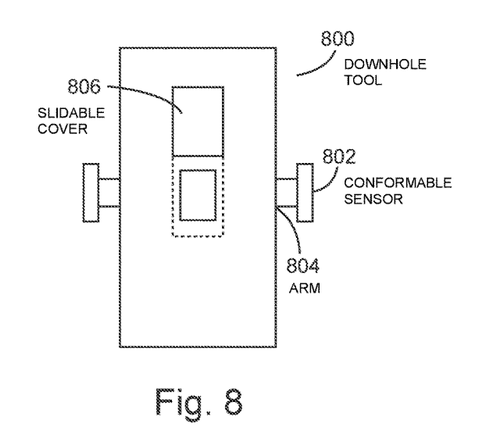
FIG. 8 is a diagram showing an example downhole tool with conformable sensors, according to aspects of the present disclosure.

FIG. 8 is a diagram of another example downhole tool 800 similar to the downhole tool illustrated in FIG. 1, in which the conformable sensors are extendable to contact the downhole element. In the embodiment shown, conformable sensors 802 are attached to the exterior surfaces of extendable arms 804. The arms 804 may extend, forcing the conformable sensors 802 to contact the target. In certain embodiments, the arms 804 may be controlled hydraulically, electrically, or may be mounted on spring arms. In certain embodiments, other mechanisms may be used to extend the conformable sensors 802, including inflatable packers. Downhole tool 800 may be useful when the target is non uniform, such as the borehole in an open hole environment. Additionally, as described above, forcing the conformable sensors 802 against the target may increase the accuracy and resolution of the resulting measurements.

In certain embodiments, each of the conformable sensors 802 may be covered by a protective element, such as the protective covering described above. In certain embodiments, slidable covers 806 also may be incorporated into the tool 800 to protect the conformable sensors 802 while they are retracted. In certain embodiments, the covers 806 may allow conformable sensors 802 to make low resolution measurements when the conformable sensors 802 are retracted. When high resolution measurements are required, the covers 806 may be retracted, allowing the conformable sensors 802 to contact the target. The covers 806 may be retracted using mechanical, electrical, or hydraulic mechanisms well known in the art. A control unit within the tool may control the covers 802 as well as the other electrical, mechanical, or hydraulic elements within the tool.

The various sensor types, configurations, and orientations may be interchangeable within the downhole tools described herein. Additionally, other mechanisms may be incorporated into the downhole tools to protect the conformable sensors from downhole conditions and to improve the accuracy of their measurements. For example, a cooling system may be incorporated into the tool to regulate the temperature of the sensors, protecting them from damage. Additionally, accelerometers may be incorporated into the tools, to identify the azimuthal orientation of the measurements.

Figures 9, 10:
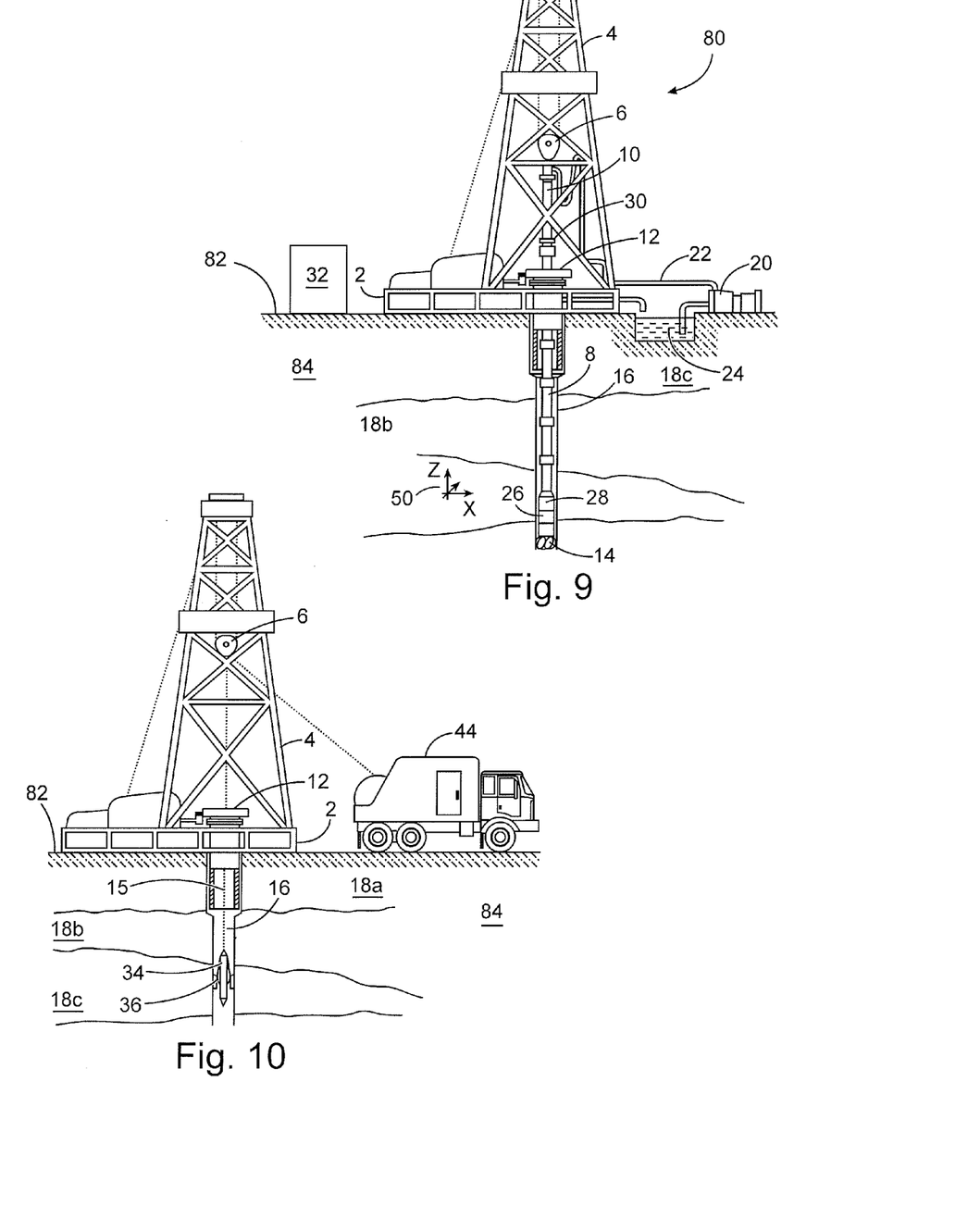
FIG. 9 is a diagram showing an illustrative logging while drilling environment, according to aspects of the present disclosure.
FIG. 10 is a diagram showing an illustrative wireline logging environment, according to aspects of the present disclosure.

FIG. 9 is a diagram of a subterranean drilling system 80 incorporating a downhole tool 26 with at least one conformable sensor, similar to the example downhole tools described above. The drilling system 80 comprises a drilling platform 2 positioned at the surface 82. In the embodiment shown, the surface 82 comprises the top of a formation 84 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one conformable sensor. As the bit extends the borehole 16 through the formations 18, the tool 26 may collect measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

At various times during the drilling process, the drill string 8 may be removed from the borehole 16 as shown in FIG. 10. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise a downhole tool 36 with at least one conformable sensor, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

According to aspects of the present disclosure an example downhole tool may include a tool body and a first conformable sensor coupled to the tool body. The first conformable sensor may include a flexible material, with a transmitter and receiver coupled to the flexible material. The downhole tool further may include an arm extendable from the tool body and a pad coupled to the arm. The first conformable sensor may be coupled to the pad. In certain embodiments, the first conformable sensor is one of an array of conformable sensors coupled to the pad. In certain embodiments, the first conformable sensor is positioned in one of a vertical orientation and a horizontal orientation on the pad. In certain embodiments, the first conformable sensors is one of an array of conformable sensors arranged vertically on the tool.

In certain embodiments, the first conformable sensor may be wrapped around the tool body. In certain embodiments, the first conformable sensor may be one of an array of conformable sensors wrapped around the tool body. In any of the embodiments described in this paragraph, the tool body may comprise a stationary portion and a rotating portion, and the first conformable sensor may be coupled to the rotating portion.

In any embodiment described in the preceding two paragraphs, the first conformable sensor may be at least partially covered by a protective covering. In any embodiment described in the preceding two paragraphs, the downhole tool may further comprise a cover slidable along the tool body to expose the first conformable sensor.

According to aspects of the present disclosure, an example method for making downhole measurement may include positioning a tool with a borehole. The tool may include a tool body and a first conformable sensor coupled to the tool body. The first conformable sensor may include a flexible material, a transmitter coupled to the flexible material, and a receiver coupled to the flexible material. An electromagnetic signal may be generated using the transmitter. A response of a downhole element to the electromagnetic signal may be measured using the receiver.

In certain embodiments, positioning the tool within the borehole comprises one of positioning the tool within the borehole using a wireline or slickline, or positioning the tool within the borehole using a drill string coupled to the tool. In certain embodiments, the method further comprises contacting the downhole element with the first conformable sensor. In certain embodiments, contacting the downhole element with the first conformable sensor comprises extending a pad from the downhole tool, and the first conformable sensor is coupled to the pad. In certain embodiments, the first conformable sensor is one of an array of conformable sensors coupled to the pad.

In certain embodiments, the first conformable sensor is positioned in one of a vertical orientation and a horizontal orientation on the pad. In certain embodiments, the method further comprises altering the azimuthal orientation of the first conformable sensor within the borehole. In certain embodiments, altering the azimuthal orientation of the first conformable sensor within the borehole comprise rotating a portion of the downhole tool, and the first conformable sensor is coupled to the portion of downhole tool.

In certain embodiments, generating the electromagnetic signal using the transmitter comprises generating the electromagnetic signal using the transmitter while the first conformable sensor is covered by a retractable protective covering. In certain embodiments, the method further comprises retracting the protective covering, and generating an other electromagnetic signal using the transmitter. In certain embodiments, the method further comprises extending the first conformable sensor to contact the downhole element after the protective cover is retracted.

In any of the embodiments described in the preceding three paragraphs, the downhole element may comprise at least one of a casing, a borehole, a subterranean formation, and a cement layer outside of the casing.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A downhole tool, comprising:
a tool body; and
a first conformable sensor coupled and conformable to the tool body, the first conformable sensor comprising:
a flexible material conformable to a shape of a downhole element;
a transmitter coupled to the flexible material; and
a receiver coupled to the flexible material;
an arm extendable from the tool body to contact the downhole element; and
a deformable pad coupled to the arm, wherein the first conformable sensor is coupled to the pad, and wherein the deformable pad deforms to the shape of the downhole element.

2. The downhole tool of claim 1, wherein the first conformable sensor is printed on the flexible material.

3. The downhole tool of claim 2, wherein the first conformable sensor is one of an array of conformable sensors coupled to the pad.

4. The downhole tool of claim 2, wherein the first conformable sensor is positioned in a vertical orientation on the pad.

5. The downhole tool of claim 1, wherein the first conformable sensor is wrapped around the tool body.

6. The downhole tool of claim 1, wherein the first conformable sensor is one of an array of conformable sensors wrapped around the tool body.

7. The downhole tool of claim 5, wherein
the tool body comprises a stationary portion and a rotating portion; and
the first conformable sensor is coupled to the rotating portion.

8. The downhole tool of claim 1, wherein the first conformable sensor is one of an array of conformable sensors arranged vertically on the tool.

9. The downhole tool of claim 1, wherein the first conformable sensor is at least partially covered by a protective covering.

10. The downhole tool of claim 1, further comprising a cover slidable along the tool body to expose the first conformable sensor.

11. A method for making downhole measurement, comprising:
positioning a tool with a borehole, the tool comprising"
a tool body; and
a first conformable sensor coupled and conformable to the tool body and including:
a flexible material conformable to a shape of a downhole element;
a transmitter coupled to the flexible material; and
a receiver coupled to the flexible material;
extending an arm from the tool body to contact the downhole element with a deformable pad coupled to the arm, wherein the first conformable sensor is coupled to the pad, and wherein the deformable pad deforms to the shape of the downhole element;
generating an electromagnetic signal using the transmitter; and
measuring a response of the downhole element to the electromagnetic signal using the receiver.

12. The method of claim 11, wherein positioning the tool within the borehole comprises one of positioning the tool within the borehole using a wireline or slickline, or positioning the tool within the borehole using a drill string coupled to the tool.

13. The method of claim 11, wherein the first conformable sensor is printed on the flexible material.

14. The method of claim 13, wherein a spring mechanism or a motor extends the arm.

15. The method of claim 14, wherein the first conformable sensor is one of an array of conformable sensors coupled to the pad.

16. The method of claim 14, wherein the first conformable sensor is positioned in one of a vertical orientation and a horizontal orientation on the pad.

17. The method of claim 11, further comprising altering the azimuthal orientation of the first conformable sensor within the borehole.

18. The method of claim 17, wherein
altering the azimuthal orientation of the first conformable sensor within the borehole comprises rotating a portion of the downhole tool; and
the first conformable sensor is coupled to the rotating portion of the downhole tool.

19. The method of claim 11, wherein generating the electromagnetic signal using the transmitter comprises generating the electromagnetic signal using the transmitter while the first conformable sensor is covered by a retractable protective covering.

20. The method of claim 19, further comprising
retracting the protective covering; and
generating an other electromagnetic signal using the transmitter.

21. The method of claim 19, further comprising extending the first conformable sensor to contact the downhole element after the protective cover is retracted.

22. The method of claim 11, wherein the downhole element comprises at least one of a casing, a borehole, a subterranean formation, and a cement layer outside of the casing.

* * * * *